(12) United States Patent
Plato et al.

(10) Patent No.: US 10,962,218 B2
(45) Date of Patent: Mar. 30, 2021

(54) STORAGE UNIT WITH LIGHT-EMITTING COMPONENTS

(71) Applicant: Milwaukee Electric Tool Corporation, Brookfield, WI (US)

(72) Inventors: Lea M. Plato, Shorewood, WI (US); Zachary J. Self, Nashotah, WI (US); Michael A. Matthews, Milwaukee, WI (US); San Sang Chan, Kowloon (HK); Matthew Asher, Kowloon (HK)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/809,287

(22) Filed: Mar. 4, 2020

(65) Prior Publication Data
US 2020/0284425 A1 Sep. 10, 2020

Related U.S. Application Data

(63) Continuation of application No. PCT/US2020/020970, filed on Mar. 4, 2020.
(Continued)

(51) Int. Cl.
*F21V 33/00* (2006.01)
*F21L 2/00* (2006.01)
(Continued)

(52) U.S. Cl.
CPC ............ *F21V 33/0084* (2013.01); *F21L 2/00* (2013.01); *F21L 4/04* (2013.01); *F21S 6/006* (2013.01);
(Continued)

(58) Field of Classification Search
CPC . F21V 33/0084; F21L 2/00; F21L 4/04; F21S 6/006; H02J 7/0045; F21Y 2115/10
See application file for complete search history.

(56) References Cited

U.S. PATENT DOCUMENTS

| 4,976,450 A | 12/1990 | Ellefson |
| 5,685,421 A | 11/1997 | Gilmore |

(Continued)

FOREIGN PATENT DOCUMENTS

| CN | 200948587 | 9/2007 |
| CN | 204354100 | 5/2015 |

(Continued)

OTHER PUBLICATIONS

International Search Report and Written Opinion for International Application No. PCT/US2020/020970, dated Jun. 29, 2020, 11 pages.

*Primary Examiner* — Anabel Ton
(74) *Attorney, Agent, or Firm* — Reinhart Boerner Van Deuren s.c.

(57) ABSTRACT

A device or unit with a lighting component is provided. The device includes coupling components that couple the device to stackable storage unit containers. In one embodiment, the device includes a battery interface to couple to a battery for power tools. In one embodiment, the device includes three lights that are pivotally coupled to the housing between a retracted position in which the lights are disposed against sidewalls of the housing, and an open position in which the lights are pivoted above the top panel of the housing.

19 Claims, 18 Drawing Sheets

Related U.S. Application Data

(60) Provisional application No. 62/815,749, filed on Mar. 8, 2019, provisional application No. 62/814,685, filed on Mar. 6, 2019.

(51) Int. Cl.
  *F21L 4/04* (2006.01)
  *H02J 7/00* (2006.01)
  *F21S 6/00* (2006.01)
  *H04B 1/3888* (2015.01)
  *F21Y 115/10* (2016.01)

(52) U.S. Cl.
  CPC ......... *H02J 7/0045* (2013.01); *F21Y 2115/10* (2016.08); *H04B 1/3888* (2013.01)

(56) References Cited

U.S. PATENT DOCUMENTS

| | | | |
|---|---|---|---|
| 5,779,350 A | 7/1998 | Chang | |
| 5,879,072 A | 3/1999 | Huang | |
| 6,223,899 B1 | 5/2001 | Shih | |
| 6,267,240 B1 | 7/2001 | Callaway | |
| 6,981,780 B2 | 1/2006 | Einav | |
| 7,252,404 B1 | 8/2007 | Messammore | |
| 7,470,036 B2 * | 12/2008 | Deighton | F21L 14/04 362/109 |
| 7,484,858 B2 | 2/2009 | Deighton et al. | |
| 8,567,796 B2 | 10/2013 | Bar-Erez et al. | |
| 8,936,258 B2 | 1/2015 | Bar-Erez et al. | |
| 9,132,543 B2 | 9/2015 | Bar-Erez et al. | |
| 9,221,169 B2 | 12/2015 | Seidel | |
| 9,381,639 B2 | 7/2016 | Werner et al. | |
| 9,381,640 B2 | 7/2016 | Van Der Linde et al. | |
| 9,492,919 B2 | 11/2016 | Roehm et al. | |
| 9,566,704 B1 | 2/2017 | Stoikos et al. | |
| 9,566,990 B2 | 2/2017 | Bar-Erez et al. | |
| 9,643,629 B2 | 5/2017 | Bar-Erez et al. | |
| 10,088,148 B2 | 10/2018 | Herr et al. | |
| 10,106,180 B2 | 10/2018 | Bar-Erez et al. | |
| 10,144,124 B2 | 12/2018 | Werner et al. | |
| 10,663,124 B1 * | 5/2020 | Smith | F21V 21/30 |
| 10,663,150 B1 * | 5/2020 | Luna | A45F 5/00 |
| 2002/0179472 A1 | 12/2002 | Lee | |
| 2005/0232747 A1 | 10/2005 | Brackmann et al. | |
| 2010/0085745 A1 | 4/2010 | Kristiansen et al. | |
| 2010/0220486 A1 * | 9/2010 | Probasco | F21S 8/028 362/372 |
| 2013/0048631 A1 | 2/2013 | Van Der Linde et al. | |
| 2013/0051080 A1 | 2/2013 | Van Der Linde et al. | |
| 2013/0058711 A1 | 3/2013 | Van Der Linde et al. | |
| 2013/0134276 A1 | 5/2013 | Van Der Linde et al. | |
| 2013/0155657 A1 | 6/2013 | Werner et al. | |
| 2013/0186795 A1 | 7/2013 | Borrelli | |
| 2014/0332423 A1 | 11/2014 | Lee | |
| 2015/0078811 A1 | 3/2015 | Van Der Linde et al. | |
| 2017/0151972 A1 | 6/2017 | Bar-Erez et al. | |
| 2017/0257958 A1 | 9/2017 | Sabbag et al. | |
| 2018/0231238 A1 | 8/2018 | Burch et al. | |
| 2019/0113464 A1 * | 4/2019 | Tingle | F21V 21/30 |

FOREIGN PATENT DOCUMENTS

| | | |
|---|---|---|
| CN | 204640191 | 9/2015 |
| CN | 204725472 | 10/2015 |
| CN | 205111818 | 3/2016 |
| CN | 105082096 | 11/2016 |
| CN | 105328673 | 9/2017 |
| CN | 107309852 | 11/2017 |
| CN | 206632975 | 11/2017 |
| CN | 206795769 | 12/2017 |
| CN | 206998861 | 2/2018 |
| CN | 108224129 | 6/2018 |
| CN | 207921804 | 9/2018 |
| CN | 209063055 | 7/2019 |
| CN | 209111035 | 7/2019 |
| DE | 102013205416 | 10/2014 |
| DE | 102015200382 | 7/2016 |
| JP | 2008516855 | 5/2008 |
| WO | WO2009137269 | 11/2009 |
| WO | WO10148656 | 12/2010 |
| WO | WO12143160 | 10/2012 |

* cited by examiner

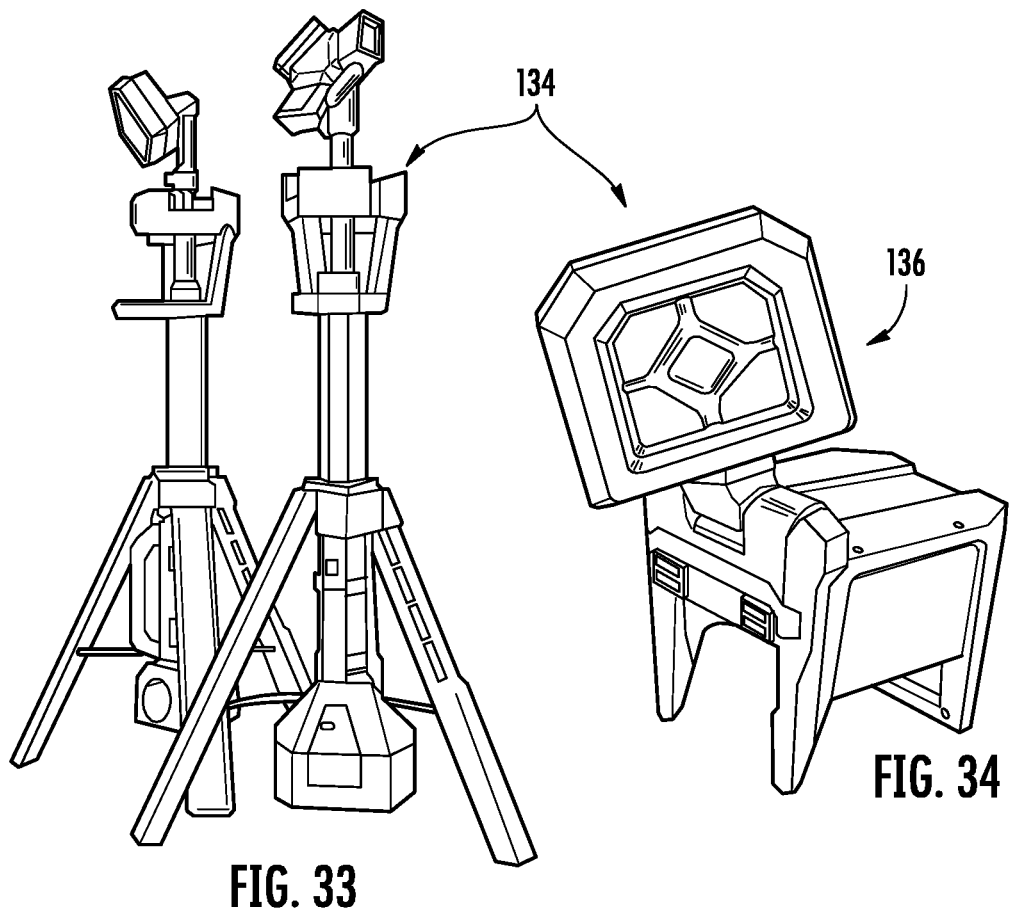
FIG. 33
FIG. 34
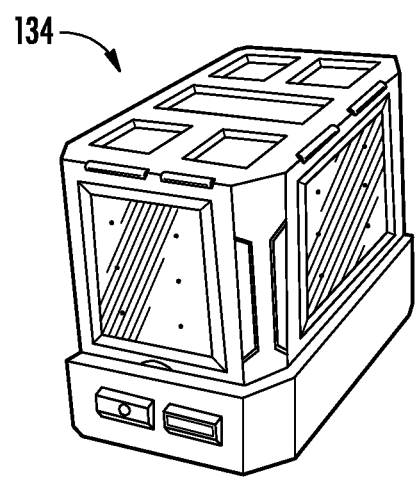
FIG. 35

STORAGE UNIT WITH LIGHT-EMITTING COMPONENTS

CROSS-REFERENCE TO RELATED PATENT APPLICATION

This application is a continuation of International Application No. PCT/US2020/020970, filed Mar. 4, 2020, which claims priority to U.S. Provisional Application No. 62/814,685, filed Mar. 6, 2019, and U.S. Provisional Application No. 62/815,749, filed Mar. 8, 2019, which are incorporated herein by reference in their entireties.

BACKGROUND OF THE INVENTION

The present disclosure is directed generally to the field of tool storage systems and related devices. The present disclosure relates specifically to a device or unit that includes one or more light-emitting components, and a coupling mechanism to detachably couple the device to another such device or container, such as a tool storage container in a modular tool storage system.

Tool storage units are often used to transport tools and tool accessories. Some storage units are designed to incorporate into a modular storage system. Within a modular storage system, different units, devices and/or containers may provide varying functions, such as being adapted to provide light.

SUMMARY OF THE INVENTION

According to one embodiment, a stackable lighting unit is configured to couple to a stackable storage unit. The stackable lighting unit includes a housing, a bottom surface defined by the housing, and a first light pivotally coupled to the housing. The bottom surface includes coupling components that couple the bottom surface of the stackable lighting unit to a top surface of the stackable storage unit. The first light rotates about a first rotational axis with respect to the housing.

According to another embodiment, a container assembly includes a lighting unit. The lighting unit includes a first housing, a bottom surface defined by the first housing, and a first light pivotally coupled to the first housing. The bottom surface of the lighting unit includes a first coupling component. The first light pivotally rotates about a first rotational axis with respect to the first housing. The container assembly also includes a storage unit. The storage unit includes a second housing, a storage space defined within the second housing, and a top surface of the storage unit defined by the second housing. The top surface includes a second coupling component. The lighting unit and the storage unit are coupled together by a first coupling component of the lighting unit interfacing with the second coupling component of the storage unit.

According to another embodiment, a stackable lighting unit is configured to couple to a stackable storage unit. The stackable lighting unit includes a housing, a bottom surface defined by the housing, a first light coupled to the housing, and a battery interface configured to couple to a power tool battery. The bottom surface includes coupling components that couple the bottom surface of the stackable storage unit to a top surface of a stackable storage unit.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

FIGS. 33-35 are perspective views of a light according to one embodiment for use with the modular storage system of FIG. 29.

DETAILED DESCRIPTION

Referring generally to the figures, an embodiment of a stackable lighting device, container or unit is shown. One or more of the devices are configured to selectively couple and decouple with storage units. The stackable device couples with storage units and includes one or more lighting panels that can be used to illuminate nearby objects and surfaces. In one embodiment the lighting unit has multiple lighting panels that are each pivotal with respect to the housing, and an interface to receive power from a power tool battery.

Figure 1:
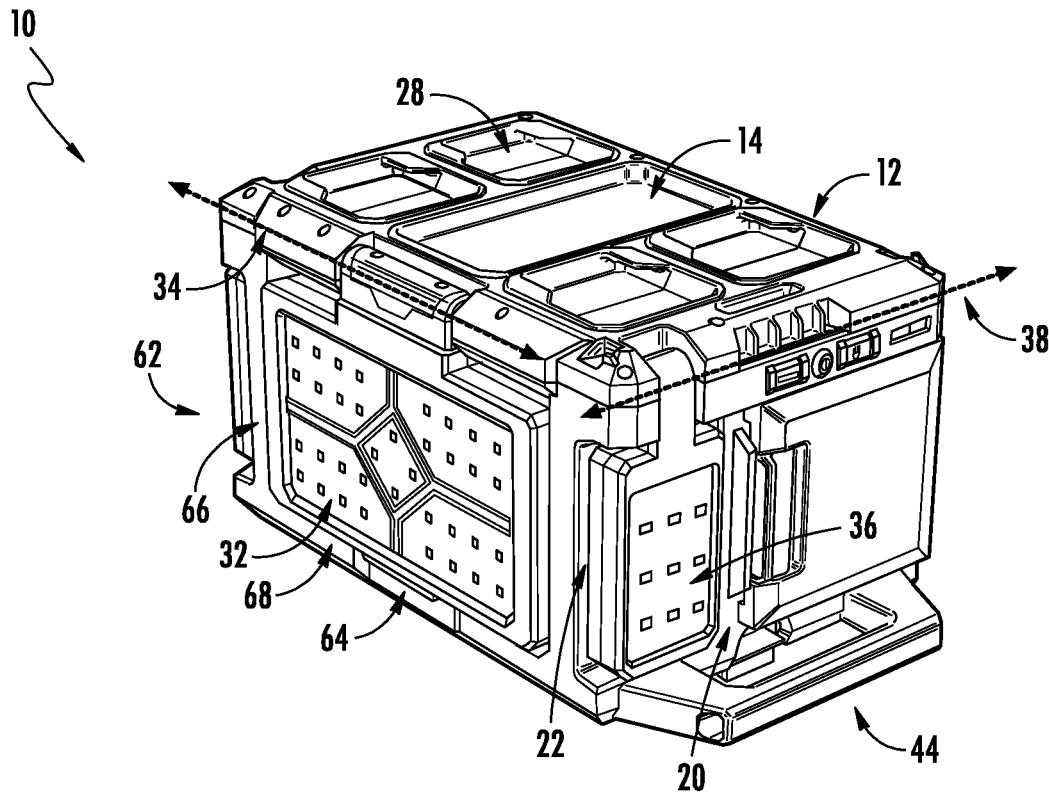
FIG. 1 is a perspective view of a lighting unit according to one embodiment.
Figure 2:
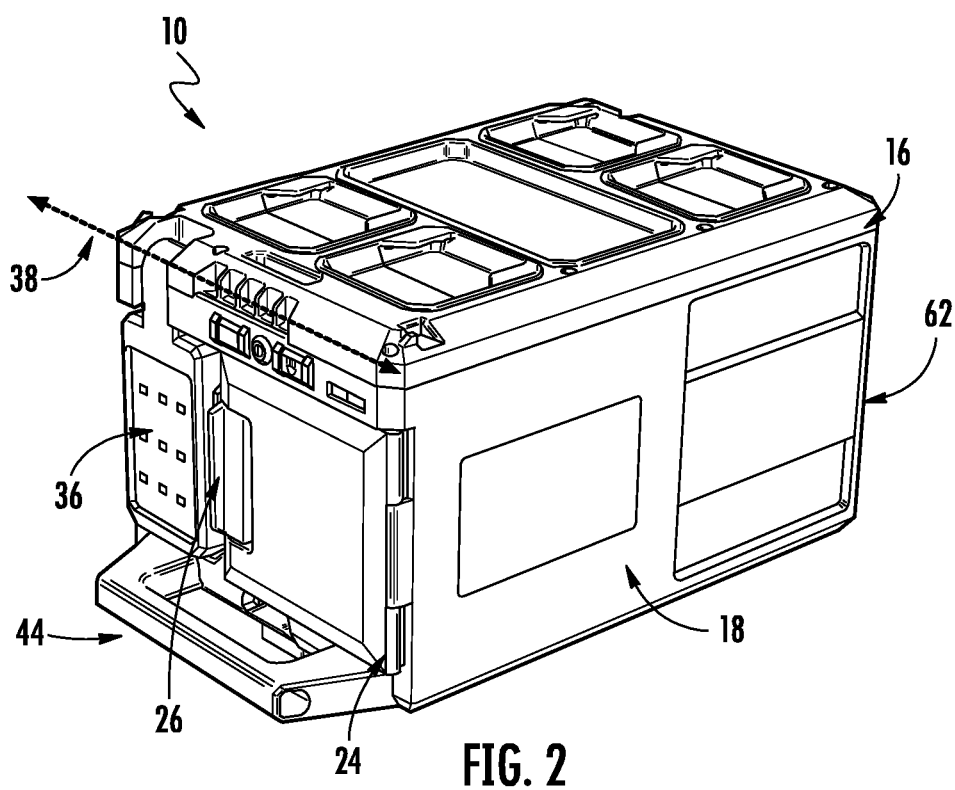
FIG. 2 is a perspective view of the lighting unit of FIG. 1.
Figure 3:
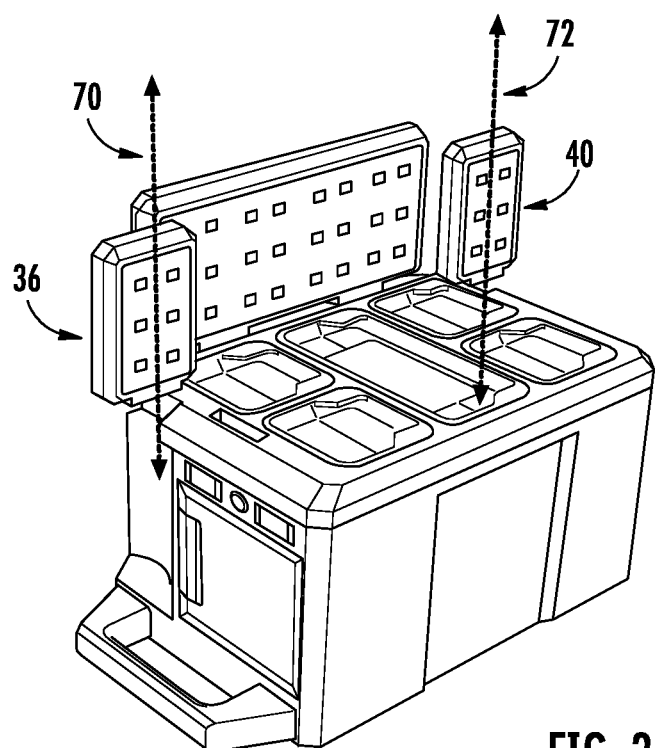
FIG. 3 is a side view of the lighting unit of FIG. 1.
Figure 4:
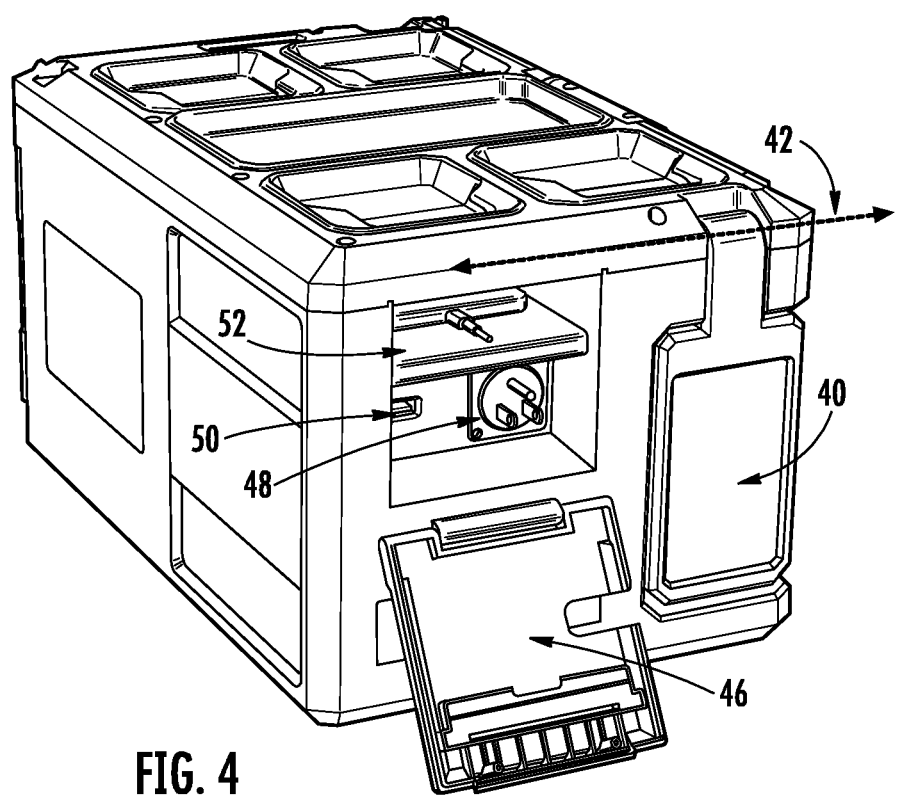
FIG. 4 is a perspective view of the lighting unit of FIG. 1.

FIGS. 1-4 depict a stackable device, shown as lighting unit 10. Lighting unit 10 includes primary light panel 32, which pivots with respect to housing 62 about axis 34. Left-side light panel 36 pivots with respect to housing 62 about axis 38, and right-side light panel 40 pivots with respect to housing 62 about axis 42. Primary light panel 32, left-side light panel 36 and right-side light panel 40 each actuate between a retracted position (FIG. 1) and an open position (FIG. 3). When primary light panel 32 is in the retracted position, primary light panel 32 is pivoted against or near back surface 68 defined by back panel 66. Similarly, when left-side light panel 36 is in the retracted position, left-side light panel 36 is pivoted against or near left-side surface 22 defined by left-side panel 20, and right-side light panel 40 is in the retracted position, right-side light panel 40 is pivoted against or near right-side surface 68 defined by right-side panel 66.

To extract primary light panel 32 from the retracted position, a user can interface with tab 64, which protrudes from primary light panel 32 above back panel 66. In a specific embodiment, left-side light panel 36 pivots with respect to housing 62 about axis 38 and is also rotatable about axis 70 (FIG. 3). Similarly, right-side light panel 40 pivots with respect to housing 62 about axis 42 and also rotates about axis 72 (FIG. 3). In a specific embodiment, left-side light panel 36 pivots about axis 38 and rotates about axis 70, which are perpendicular to each other. In a specific embodiment, right-side light panel 40 pivots about axis 42 and rotates about axis 72, which are perpendicular to each other.

In a specific embodiment, axis 38 that left-side light panel 36 rotates about is parallel to axis 42 that right-side light panel 40 rotates about, and both axis 38 and axis 42 are perpendicular to axis 34 that primary light panel 32 rotates about.

Lighting unit 10 includes a top panel 12 that defines top surface 14. Top surface 14 comprises one or more coupling components 28, shown as recesses with two ledges that overhang the recesses. Coupling components 28 interface with corresponding coupling components on a bottom surface of another unit, such as a storage unit, to couple lighting unit 10 to the storage unit. For example, coupling components 28 interface with a storage unit that includes coupling components 30 (e.g., like shown in FIG. 11).

Front panel 16 defines front surface 18 of housing 62. Handle 44 protrudes from housing 62 and can be used to carry and/or move lighting unit 10.

Figure 5:
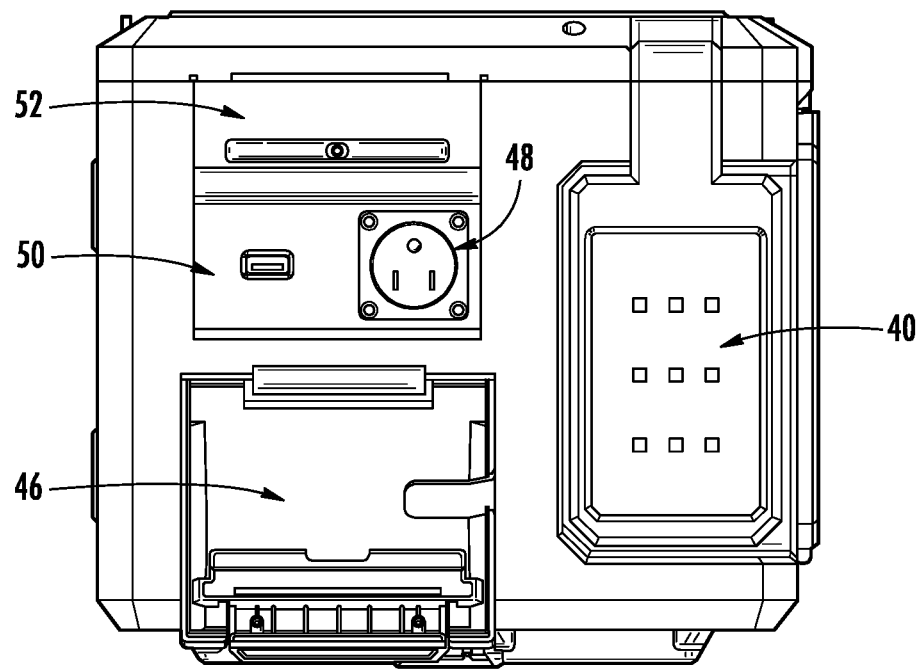
FIG. 5 is a side view of the lighting unit of FIG. 1.
Figure 6:
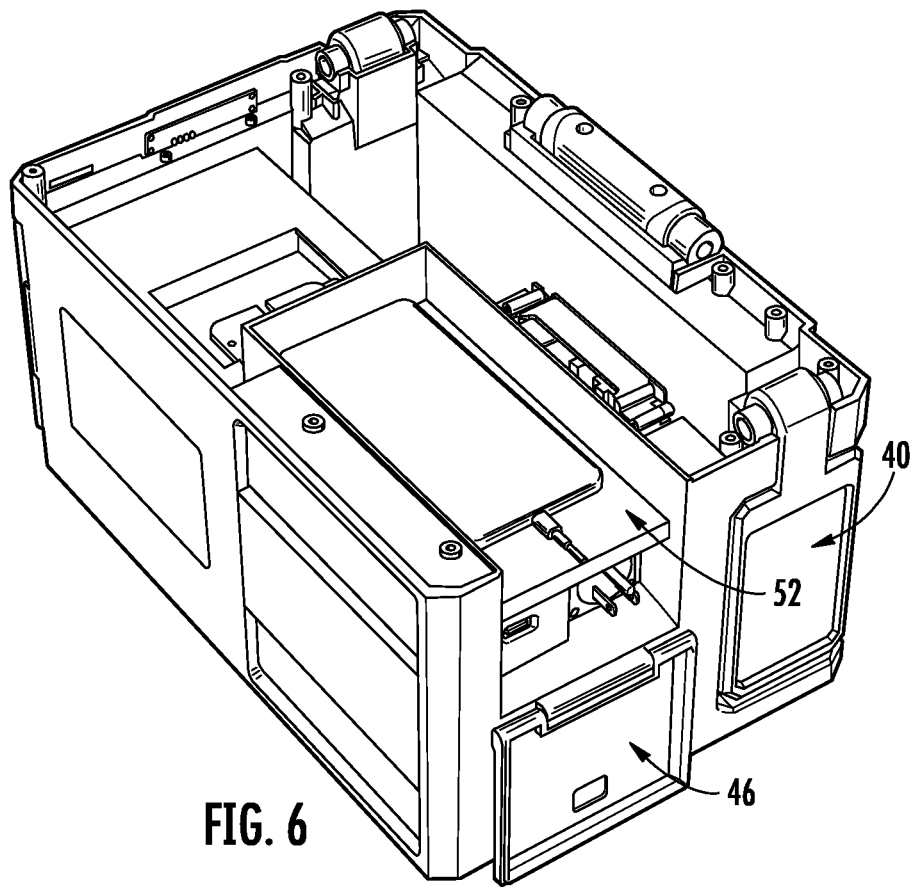
FIG. 6 is a perspective view of the lighting unit of FIG. 1 with the top panel removed.

Turning to FIGS. 5-6, door 46 encloses electrical interface 48, shown as a plug, personal electronic device interface 50, shown as a USB-compatible plug, and compartment 52, which is dimensioned to store a cellular phone being charged via personal electronic device interface 50.

Figure 7:
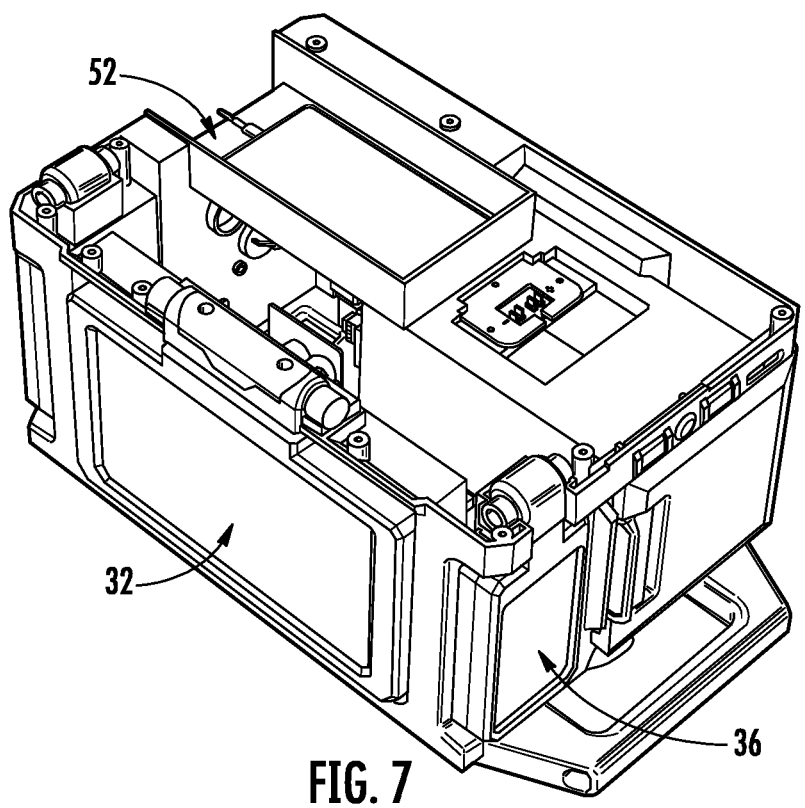
FIG. 7 is a perspective view of the lighting unit of FIG. 1 with the top panel removed.
Figure 8:
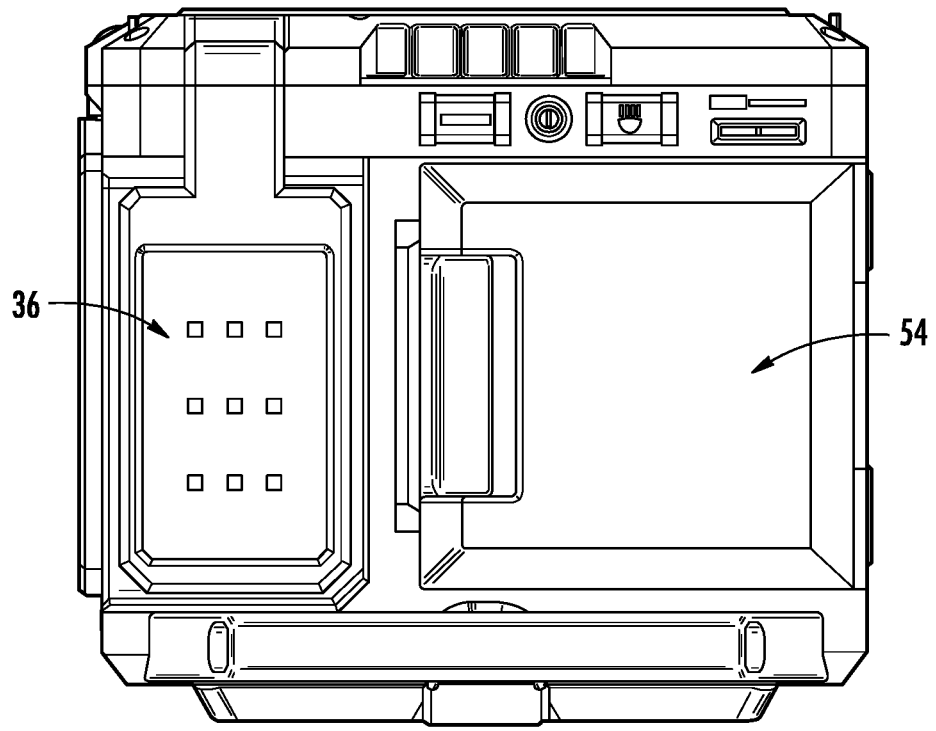
FIG. 8 is a side view of the lighting unit of FIG. 1.
Figure 9:
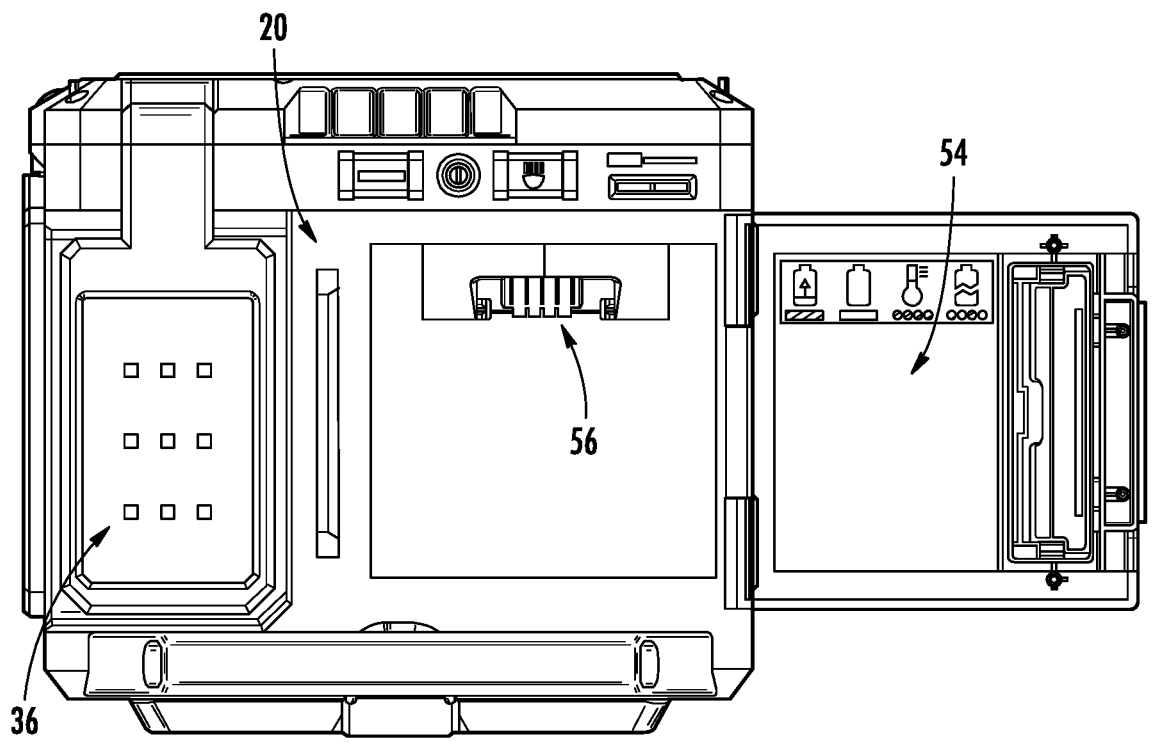
FIG. 9 is a side view of the lighting unit of FIG. 1.
Figure 10:
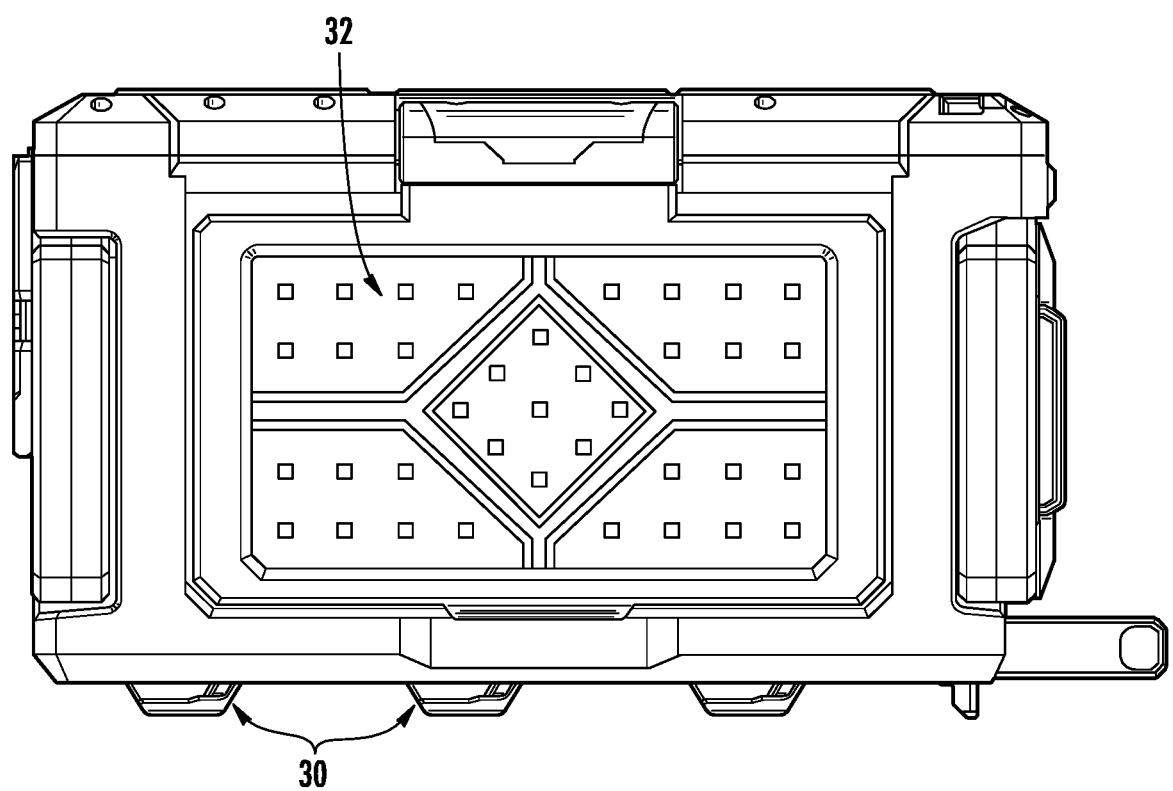
FIG. 10 is a back view of the lighting unit of FIG. 1.

Turning to FIGS. 7-10, depicted are various aspects of lighting unit 10. FIGS. 7-8 depict lighting unit 10 with top panel 12 removed. FIG. 9 depicts the left-side of lighting unit 10, including door 54. Door 54 actuates between a closed position in which battery interface 56 is enclosed, and an open position in battery interface 56 is accessible. In a specific embodiment battery interface 56 is configured to interface with a rechargeable battery for personal power tools (e.g., a battery for a wireless drill).

In one or more embodiments the light panels of lighting unit may be illuminated in various combinations as a result of one of a plurality of modes being selected. For exemplary purposes only, in a first mode all three of primary light panel 32, left-side light panel 36 and right-side light panel 40 emit light, in a second mode only primary light panel 32 emits light and left-side light panel 36 and right-side light panel 40 emit light, and in a third mode only left-side light panel 36 and right-side light panel 40 emit light while primary light panel 32 does not emit light.

Figure 11:
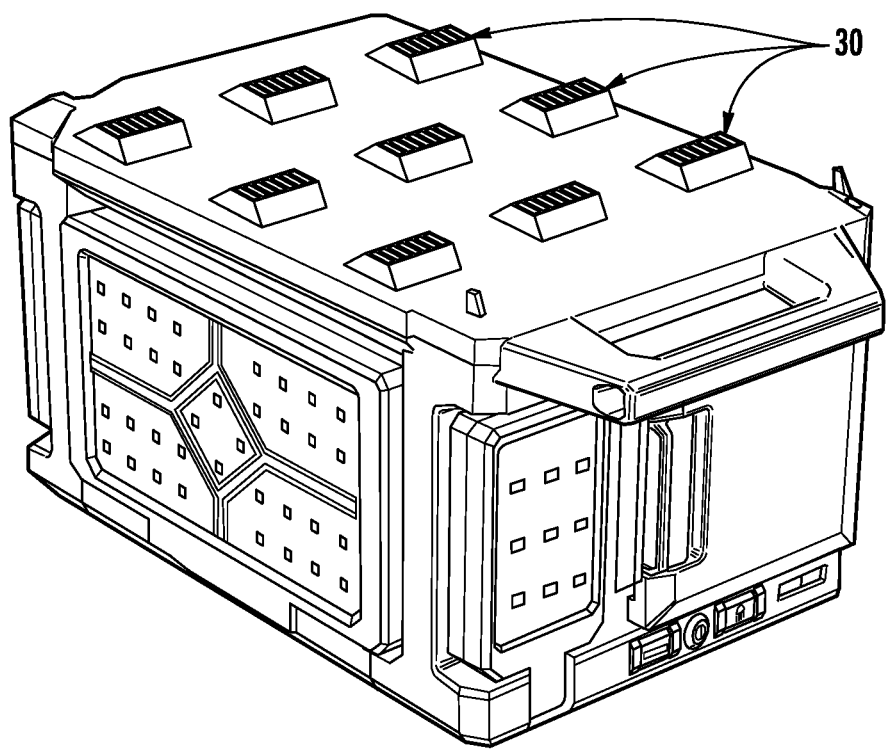
FIG. 11 is a back view of a lighting unit according to another embodiment.

FIG. 11 depicts various aspects of lighting unit 10, including a plurality of coupling components 30. Coupling components 30 are configured to interface with the top surface of other units, such as storage units, that include coupling components 28.

Figure 12:
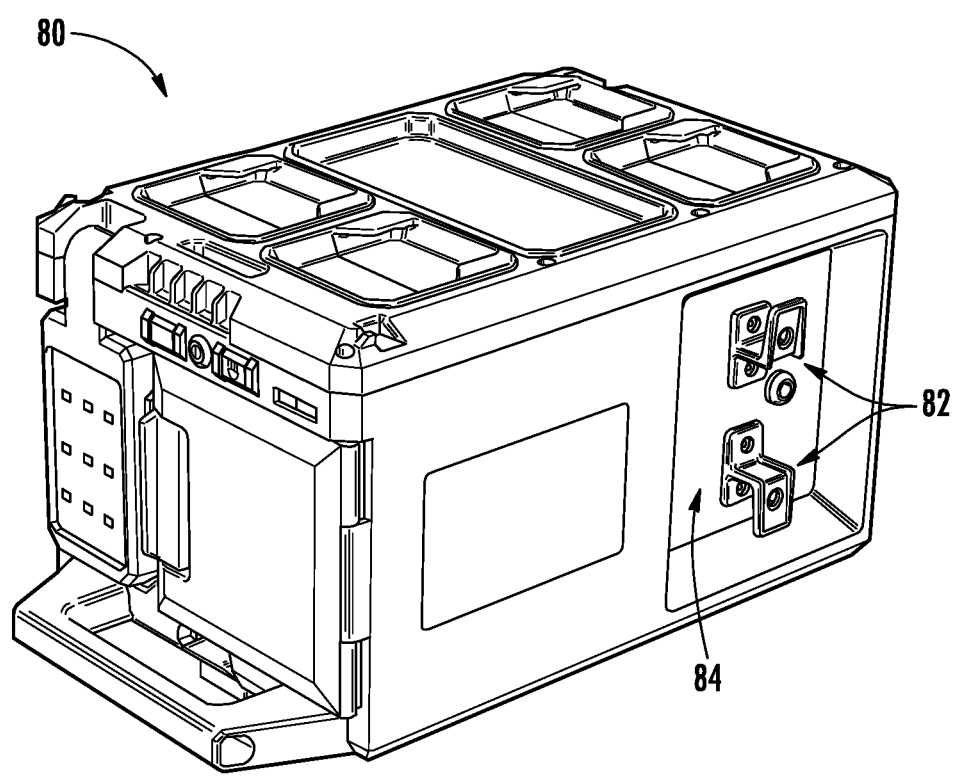
FIG. 12 is a perspective view the lighting unit of FIG. 11.

FIG. 12 depicts lighting unit 80. Lighting unit 80 is functionally similar to lighting unit 10 except as described herein. Lighting unit 80 includes recess 82 from which projections 84 extend. In a specific embodiment, projections 84 are configured to receive a power cord that is wrapped around projections 84.

In a specific embodiment, the panel in left-side light panel 36 and right-side light panel 40 that emits light is 60 mm wide and 100 mm tall, from the perspective of left-side light panel 36 and right-side light panel 40 being in the retracted position. In a specific embodiment the panel in primary light panel 32 that emits light is 280 mm wide and 105 mm tall, from the perspective of primary light panel 32 being in the retracted position. In a specific embodiment the power tool battery and the sidewalls of the battery compartment are 25 mm apart, and the bottom of the power tool battery and the bottom of the battery compartment is 15 mm apart. In a specific embodiment the panels of primary light panel 32, left-side light panel 36 and right-side light panel 40 that emit light include a heat sink (e.g., a 6061 aluminium alloy) behind the light-emitters (e.g., LEDs), a reflector behind the light-emitters (e.g., PC ABS), and a lens in front of the light-emitters.

In various embodiments of lighting unit 10, the lights, shown as light panels, are selected from the group consisting of an area light (e.g., a light that illuminates 360 degrees), a flood light (e.g., a light that illuminates 180 degrees) and a focused light, such as a task-focused light (e.g., a light that is focused to an angle between 90 degrees and 120 degrees). In a specific embodiment of lighting unit 10, lighting unit 10 includes one area light and one task-focused light. In another specific embodiment of lighting unit 10, lighting unit 10 includes one task-focused light and one light selected from the group consisting of an area light and a flood light.

Figures 13, 14:
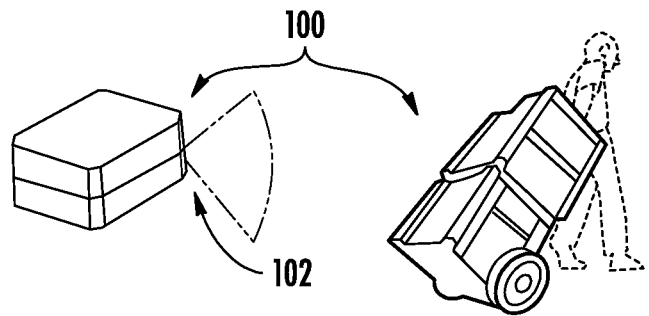
FIG. 13 is a perspective view of a portion of a modular storage system that has a light according to one embodiment.
FIG. 14 is another perspective view of the portion of the modular storage system and light of FIG. 13.

FIGS. 13-14 illustrate a modular storage system 100 including a light 102 according to one embodiment. The lights 102 of FIGS. 13-14 illuminate the path in front of a user while moving the modular storage system 100. The light 102 may also be oriented to illuminate a desired area when the modular storage system 100 is stationary. In the illustrated embodiment, the light 102 is configured to emit 300 lumens but other or additional embodiment may emit more or less lumens. The light 102 according to the embodiment in FIGS. 13-14 has one or more light-emitting diode (LED) locations that are built into the modular storage system 100.

Figures 15, 16:
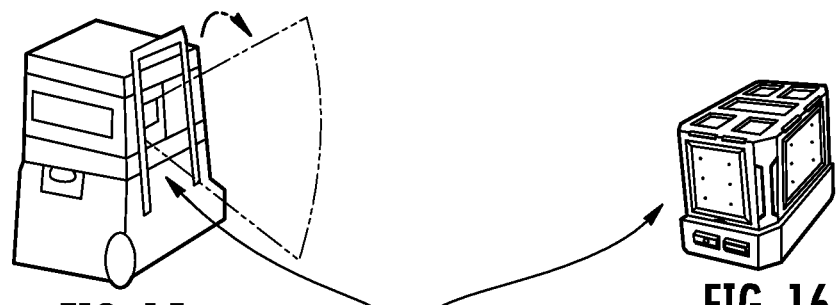
FIGS. 15 and 16 are perspective views of a portion of a modular storage system that has a light according to another embodiment
Figure 17:
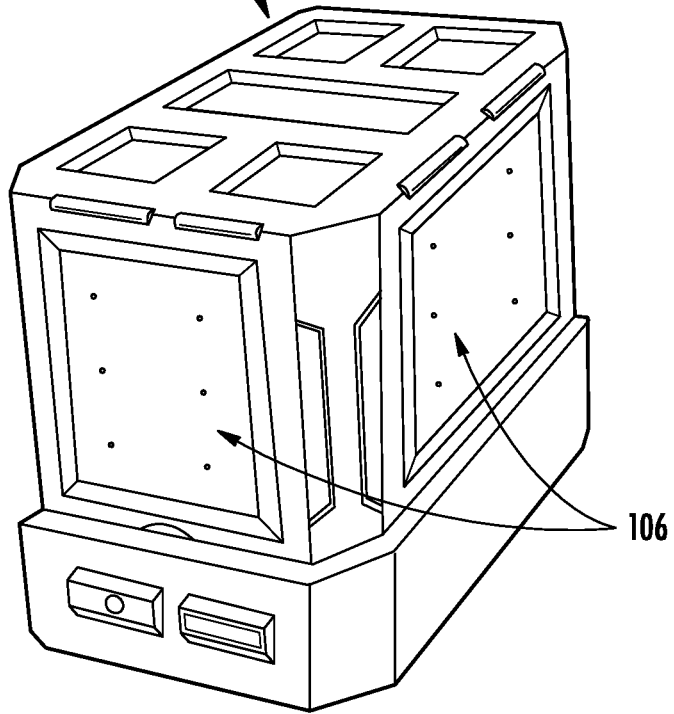
FIG. 17 is a detailed perspective view of the portion of the modular storage system and light of FIGS. 15 and 16.

FIGS. 15-17 illustrate a modular storage system 104 including a light according to another embodiment. The lights of FIGS. 15-17 illuminate the path in front of a user while moving the modular storage system 104. The light may also be oriented to illuminate a desired area when the modular storage system 104 is stationary. In the illustrated embodiment, the light is configured to emit 300 lumens, but other or additional embodiment may emit more or less lumens. The light 106 according to the embodiment of FIGS. 15-17 has one or more light panels 106 that are housed on the sides of the modular storage system, are foldable (e.g., moveable or pivotable) relative to the movable storage system 104, are useable while being transported or while stationary, and are integrated in the full system.

Figure 18:
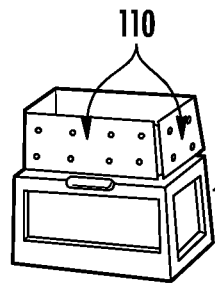
FIGS. 18-20 are perspective views of a portion of a modular storage system that has a light according to another embodiment.
Figure 19:
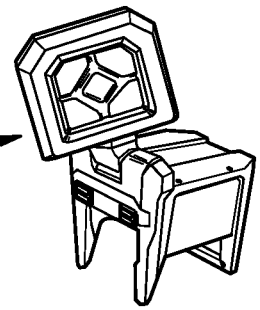
Figure 20:
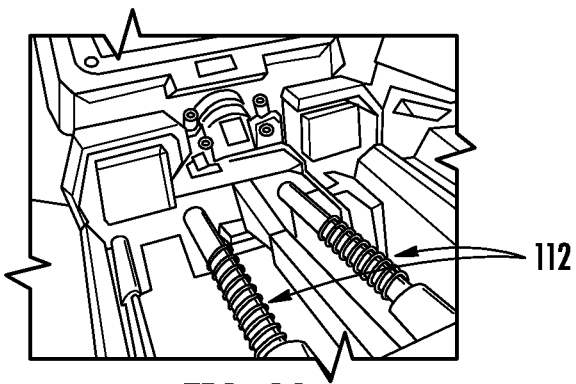

FIGS. 18-20 illustrate a modular storage system 108 including a light according to another embodiment. The light of FIGS. 18-20 can illuminate 360 degrees as an area light or can be a task focused light and have a beam angle of between 90 degrees and 120 degrees. As shown in FIGS. 18-20, the light includes one or more panels 110 (e.g., three panels) that are foldable (e.g., pivotable) and rotatable relative to the modular storage system 108. For example, turning to FIG. 20 in particular, there is a first pivot point to spin each of the light panels 360 degrees and is created by attaching a spindle 112 to the light head and having it protrude down and out of the bottom. Moreover, a threaded part of the spindle 112 is compressed by a threaded washer to create a resistance force when spinning. Also, an up and down fold is created with, for example, wave washers being compressed and mounted to the side of the light.

Figure 21:
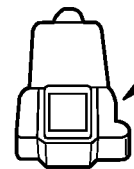
FIGS. 21 and 22 are perspective views of a portion of a modular storage system that has a light according to another embodiment.
Figure 22:
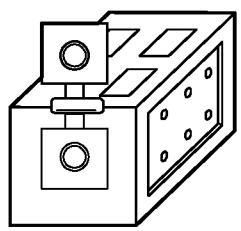

FIGS. 21 and 22 illustrates a modular storage system 114 including a light according to another embodiment. The light of FIGS. 21 and 22 can illuminate 360 degrees as an area light or can be a task focused light and have a beam angle of between 90 degrees and 120 degrees. As shown in FIGS. 21 and 22, the light is a dome luminaire that provides task lighting. The dome luminaire is movable (e.g., pivotable) relative to the modular storage system.

Figure 23:
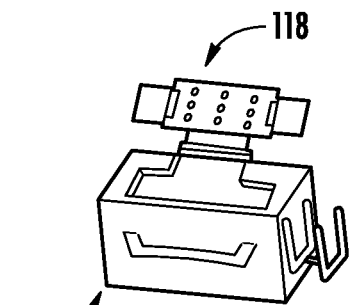
FIG. 23 is a perspective view of a portion of a modular storage system that has a light according to another embodiment.

FIG. 23 illustrates a modular storage system 116 including a light according to another embodiment. The light of FIG. 23 can illuminate 360 degrees as an area light or can be a task focused light and have a beam angle of 120 degrees. As shown in FIG. 23, the light is a main panel 118 that is movable (e.g., pivotable) relative to the modular storage system, and the auxiliary panels fold off (e.g., pivot from) of the main panel.

Figure 24:
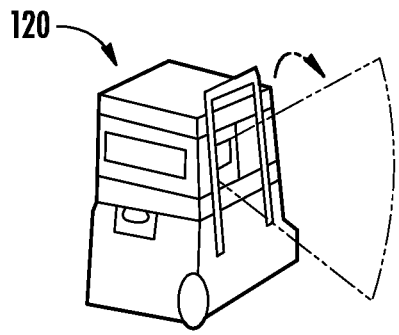
FIG. 24 is a perspective view of a portion of a modular storage system that has a light according to another embodiment.

FIG. 24 illustrates a modular storage system 120 including a light according to another embodiment. The light of FIG. 24 can be transported with the modular storage system 120 and can be integrated into any configuration and location on the system. In the illustrated embodiment, the light is stored on (e.g., coupled to) the top of the modular storage system 120, but in other embodiments, the light may be stored on (e.g., coupled to) other locations of the modular storage system. The light may have cleats on the bottom and top of the light allow users to store the light in any configuration of the modular storage system. Alternatively, cleats on the bottom and top of the light allow users to store the light in any configuration of the modular storage system and the light can function/illuminate an area from any of those locations. It is within the scope of this application that in one or more embodiments a user interface (UI) and a battery of the modular storage system are accessible in any location on the modular storage system.

Figure 25:
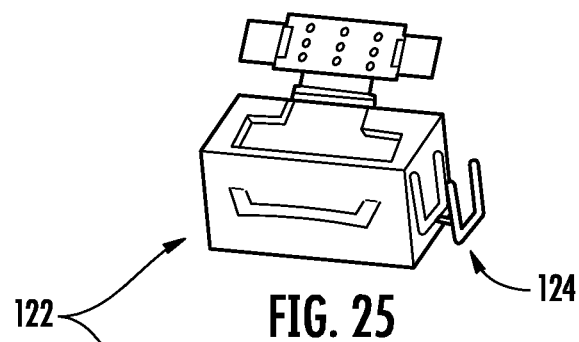
FIGS. 25 and 26 are perspective views of a portion of a modular storage system that has a coupling mechanism according to one embodiment.
Figure 26:
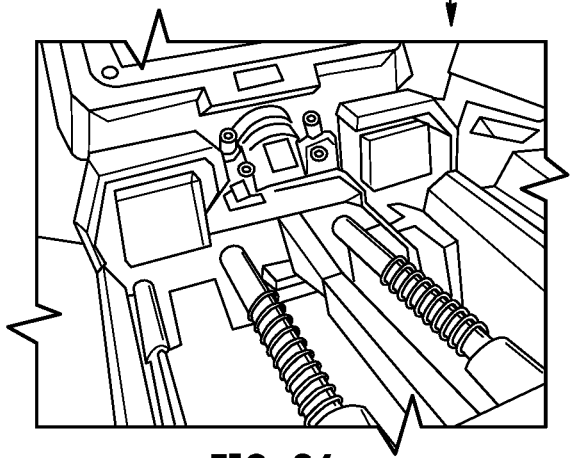
Figure 27:
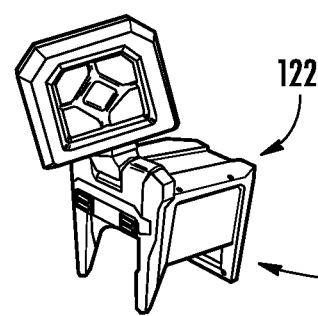
FIGS. 27 and 28 are perspective views of a portion of a modular storage system that has a coupling mechanism according to another embodiment.
Figure 28:
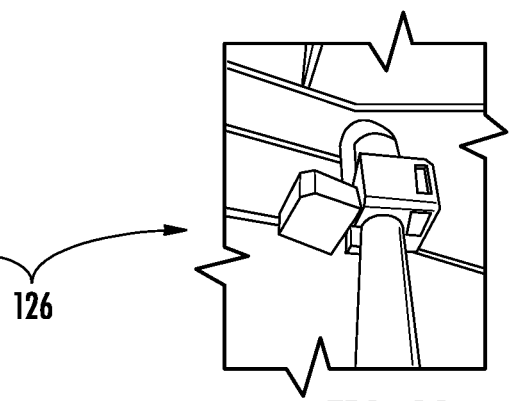

FIGS. 25-28 illustrate a modular storage system 122 in which a light functions both on and off the modular storage system. Moreover, the light is capable of attaching to multiple different surfaces or objects by a coupling mechanism. As shown in FIGS. 25 and 26, the light includes a coupling mechanism that is a clamp, which couples the light to another different surface or object. The clamp 124 functions with one or more biasing mechanisms (e.g., springs) that compress as the clamp is pulled away from the light. Once the clamp 124 is around the surface or object, the clamp is released such that it retracts and catches on the surface object thereby holding the light in place. In other or alternative embodiments (FIGS. 27 and 28), the coupling mechanism may include magnets 126 that couple the light to metal surfaces or objects. Additionally or alternatively, the light may include a handle that allows the user to carry or transport the light on the job site.

The lights shown and described herein in FIGS. 13-28 have a color temperature of 4000K and a color rendering index (CRI) of at least 80 (e.g., 80+). Moreover, the lights shown and described herein in FIGS. 13-28 can output at least 2500 lumens with a four hour runtime with a 5.0 amp hour battery pack. Additionally, the lights shown and described herein in FIGS. 13-28 can output at least 300 lumen while in a path lighting flood mode with a ten hour runtime with a 5.0 hour battery pack. The lights shown and described herein in FIGS. 13-28 also have a beam angle for area lighting of 360 degrees and task lighting of 90 degrees to 120 degrees. The lights, the modular storage system, or both have an integrated charging system to charge direct current (DC) batteries from an alternative current (AC) power source. The system is efficient as well (e.g., LED driver, optic, LED). The light is durable in harsh weather conditions and is still able to operate on the job site. The light has an indoor storage/outdoor use product rating. That is, the battery is sealed in a compartment with a gasket. The light is IP54 rated. The lights shown and described herein in FIGS. 13-28 have thermal dissipation of respective engines thereof with heat sinking.

Figure 29:
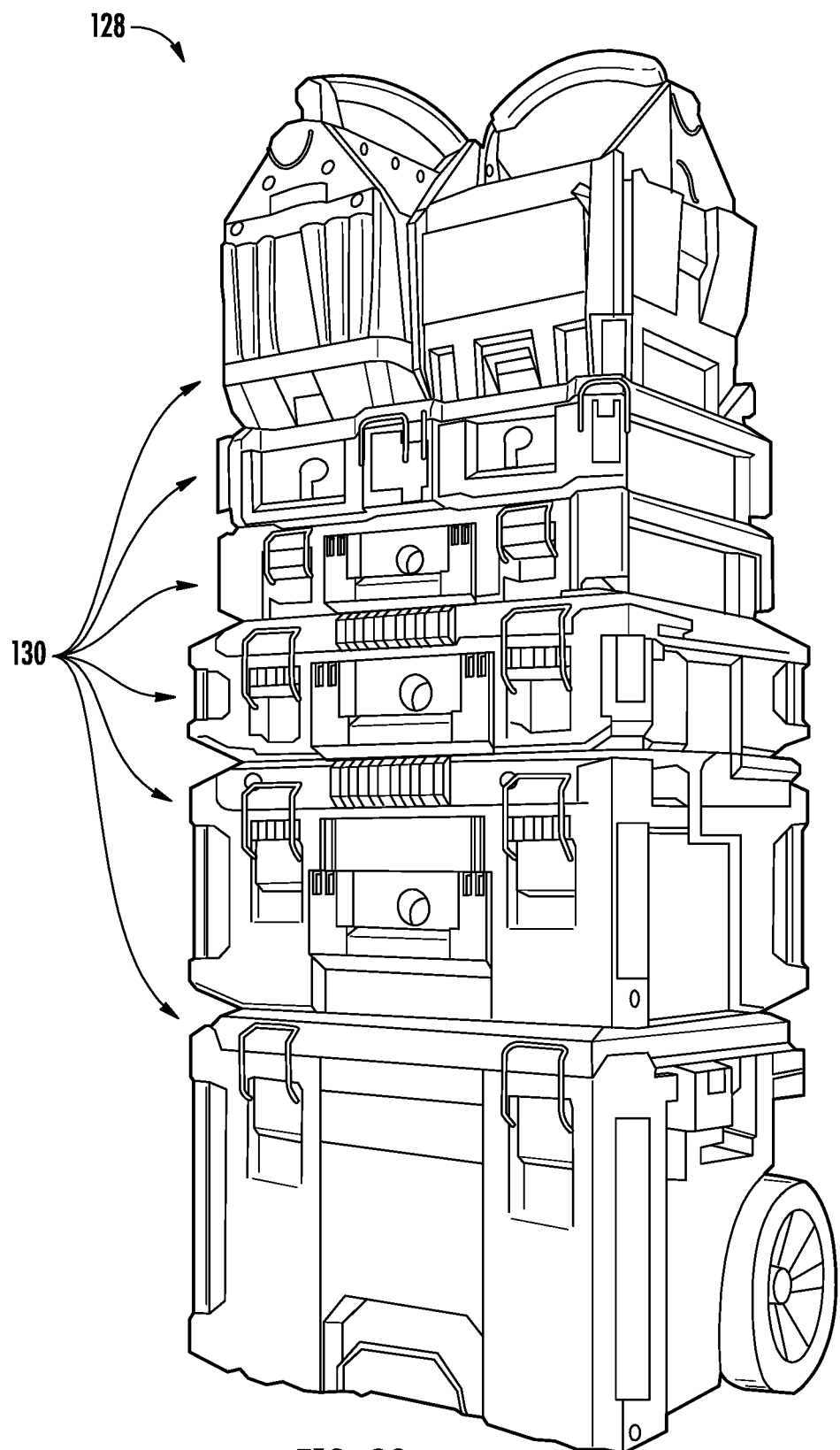
FIG. 29 is a perspective view of a modular storage system.

FIG. 29 illustrates a modular storage system 128 including stackable containers 130, which are movable by one or more wheels.

Figure 30:
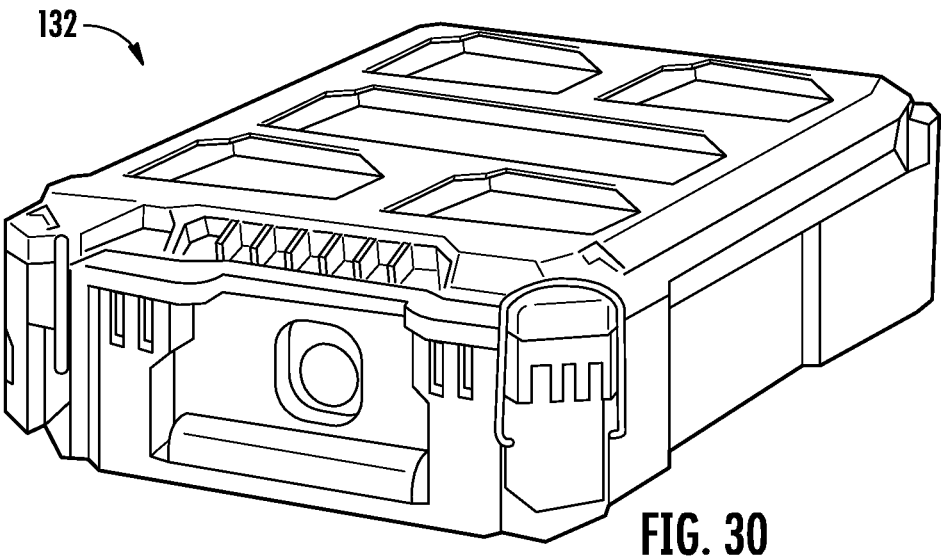
FIG. 30 is a perspective view of a light according to one embodiment for use with the modular storage system of FIG. 29.
Figure 31:
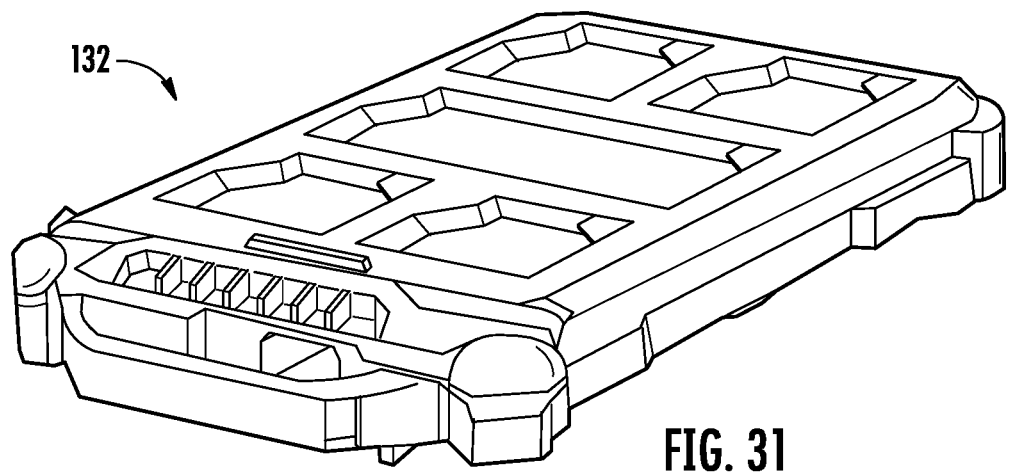
FIG. 31 is a perspective view of a light according to one embodiment for use with the modular storage system of FIG. 29.
Figure 32:
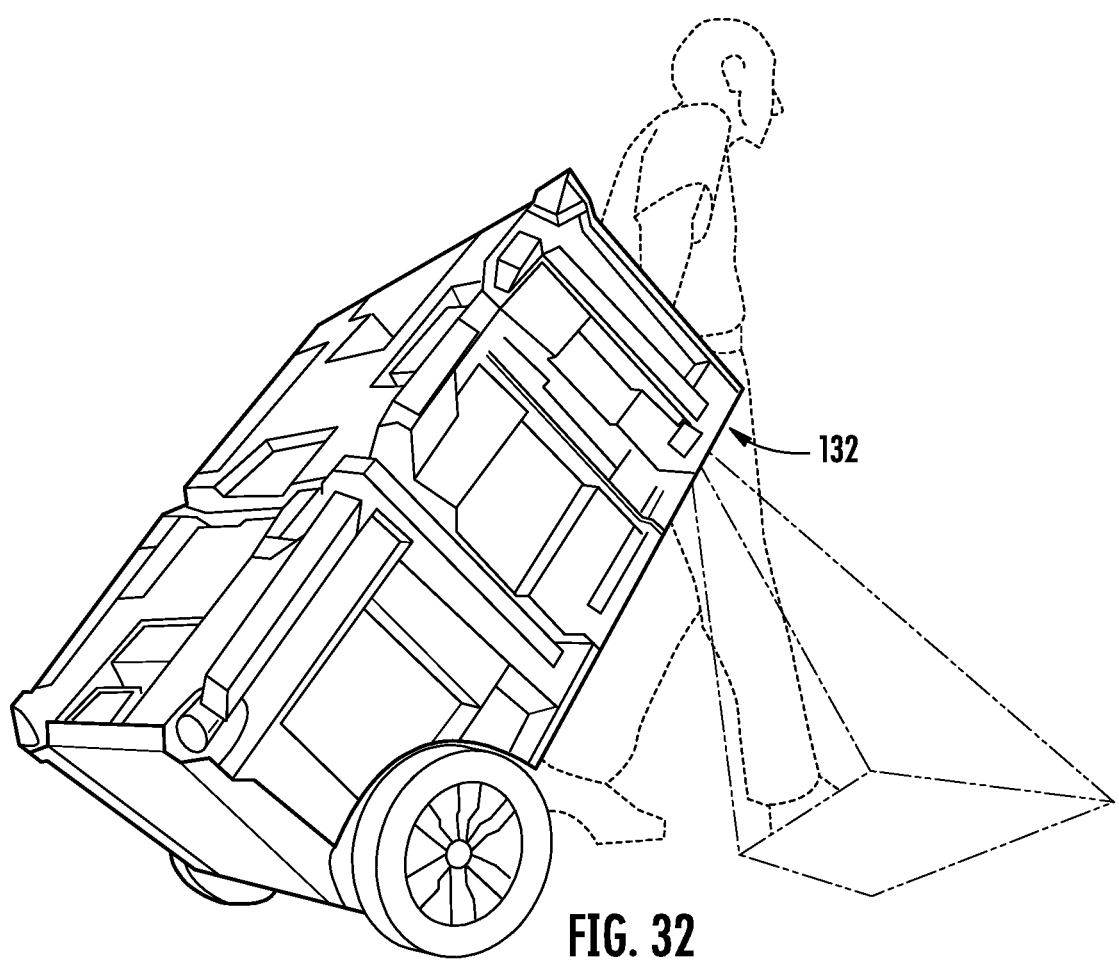
FIG. 32 is a perspective view of a modular storage system including either of the lights of FIG. 30 or 31.

FIGS. 30-32 illustrate lights 132 for use with the modular storage system of FIG. 29. The lights have a battery platform. Also, the lights have stacking mechanisms on either or both of the top and the bottom such that that lights can be stacked on one or more of the containers of the modular storage system. In a specific embodiment, the lights consume at least half a width stack. The lights are useable while coupled to the modular storage system. All functions (e.g., the battery, controls, lighting, etc.) of the lights are accessible while coupled to the modular storage system.

The lights are also usable while not coupled to the modular storage system. The lights are capable of emitting light in 360 degrees. The lights are capable of being powered by direct current (DC), alternating current (AC) or both. The lights are easily transportable as well.

With respect to FIG. 32, the lights are positionable on the modular storage system. As shown in FIG. 32, the lights illuminate the path in front of a user while moving the modular storage system. The lights may also be oriented to illuminate a desired area when the modular storage system is stationary. The user has the ability to control light output direction. Moreover, as discussed in greater detail below, the lights are also capable of being coupled to another object such as a pipe, stud, beam, ladder or other object.

FIG. 33-35 illustrates a light for use with a modular storage system according to another embodiment. As shown in FIG. 33-35, the light 134 has a head or panel 136 that is movable relative to the modular storage system. That is the head may be pivotable, rotatable, or both relative to the modular storage system.

Figure 36:
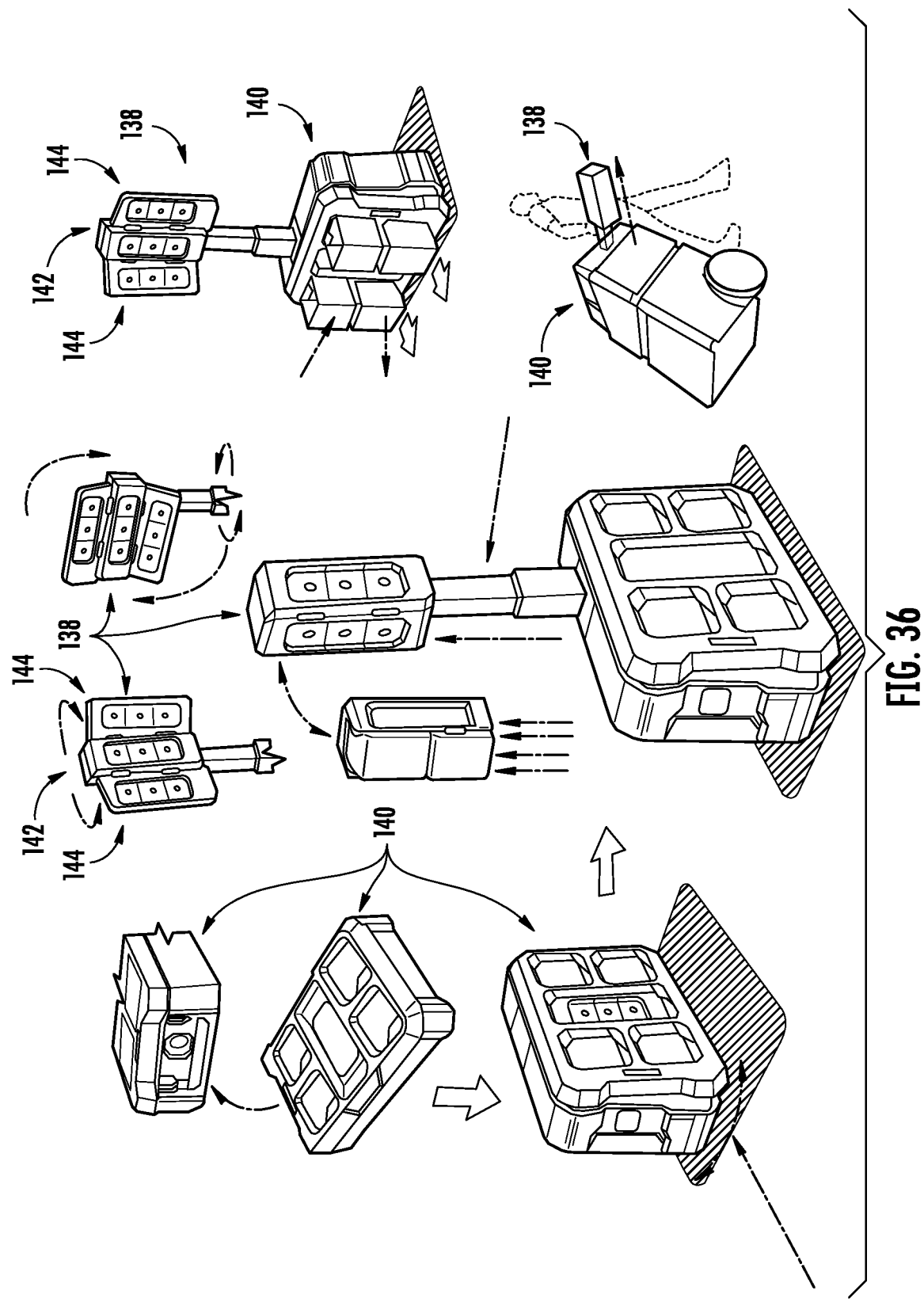
FIG. 36 is a perspective view of a light according to one embodiment for use with the modular storage system of FIG. 29.

FIG. 36 illustrates a light 138 for use with a modular storage system according to another embodiment. In the embodiment illustrated in FIG. 36 the light 138 is movably (e.g., pivotably) coupled to a container. The light 138 may be positioned in a lid of the container 140 for example. Accordingly, the light 138 may be movable (e.g., pivotable) relative to the container 140 and may be used as a stand. Additionally or alternatively, the light 138 be positioned on a support that is movable (e.g., slideable, pivotable, rotatable) relative to the container. The support may be a telescoping support that is movable relative to the container. Alternatively or additionally, the light 138 may be movable (e.g., slideable, pivotable, rotatable) relative to the support and may also be pivotable or rotatable relative to the container. In the embodiment illustrated in FIG. 36 the container 140 may also provide storage space. The storage space may be inside the container 140 or outside the container 140. Moreover, the light 138 may include a main panel 142 and auxiliary panels 144 that are coupled and foldable relative to the main panel 142. The main panel 142 and auxiliary panels 144 may each be movable (e.g., pivotable or rotatable) to adjust the direction of the light. Regardless of the construction of the light 138, the light 138 is compact, emits light 360 degrees, illuminates the path of the user, and provides storage for small accessories and hand tools. Moreover, the light 138 may be constructed as a tower light or a task light.

Figure 37:
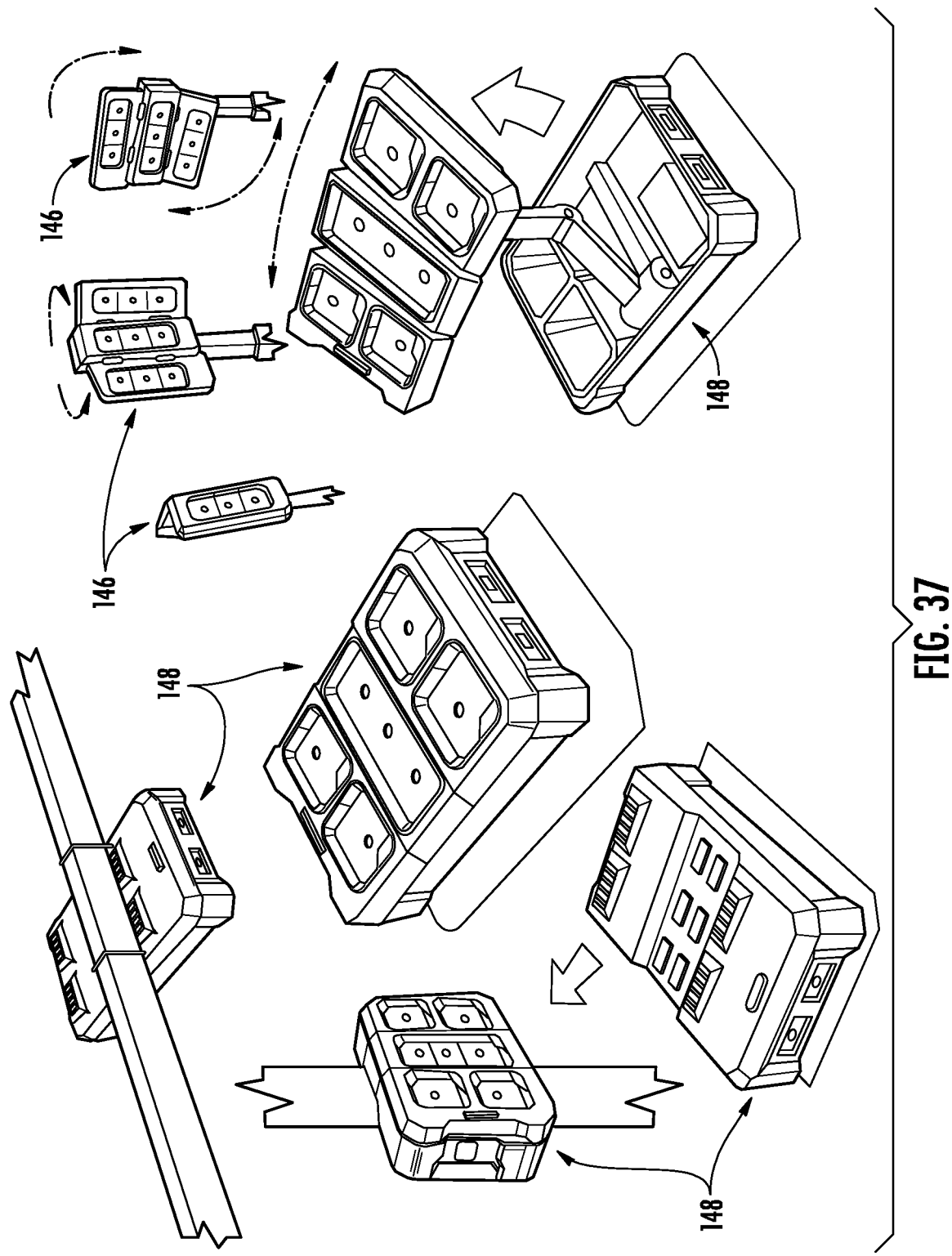
FIG. 37 is a perspective view of a light according to one embodiment for use with the modular storage system of FIG. 29.

FIG. 37 illustrates a light 146 according to another embodiment. In the embodiment illustrated in FIG. 37 the light 146 is movably (e.g., pivotably) coupled to a container 148. In particular, in a first position the light 146 is adjacent the container 148 and in a second position the light 146 is spaced apart from the container 148 by a support. In the second position, the light 146 is movable (e.g., pivotable or rotatable) relative to the container 148 about the support. In the illustrated embodiment the light 146 may be pivotable or rotatable in two directions (e.g., about two axes). The light 146 may be a single panel with light-emitting diodes (LEDs) or multiple panels with LEDs. The multiple LED panels may be movable or foldable relative to one another. Additionally or alternatively, lights 146 may be incorporated in a housing of the container 148. The container 148 includes a coupling mechanism (e.g., magnets) such that the container 148, with the light 146 can be coupled to an object (e.g., beam or post). Moreover, the light 146 is compact, emits light 360 degrees, illuminates the path of the user, and provides storage for small accessories and hand tools. Moreover, the light 146 may be constructed as a tower light or a task light.

Figure 38:
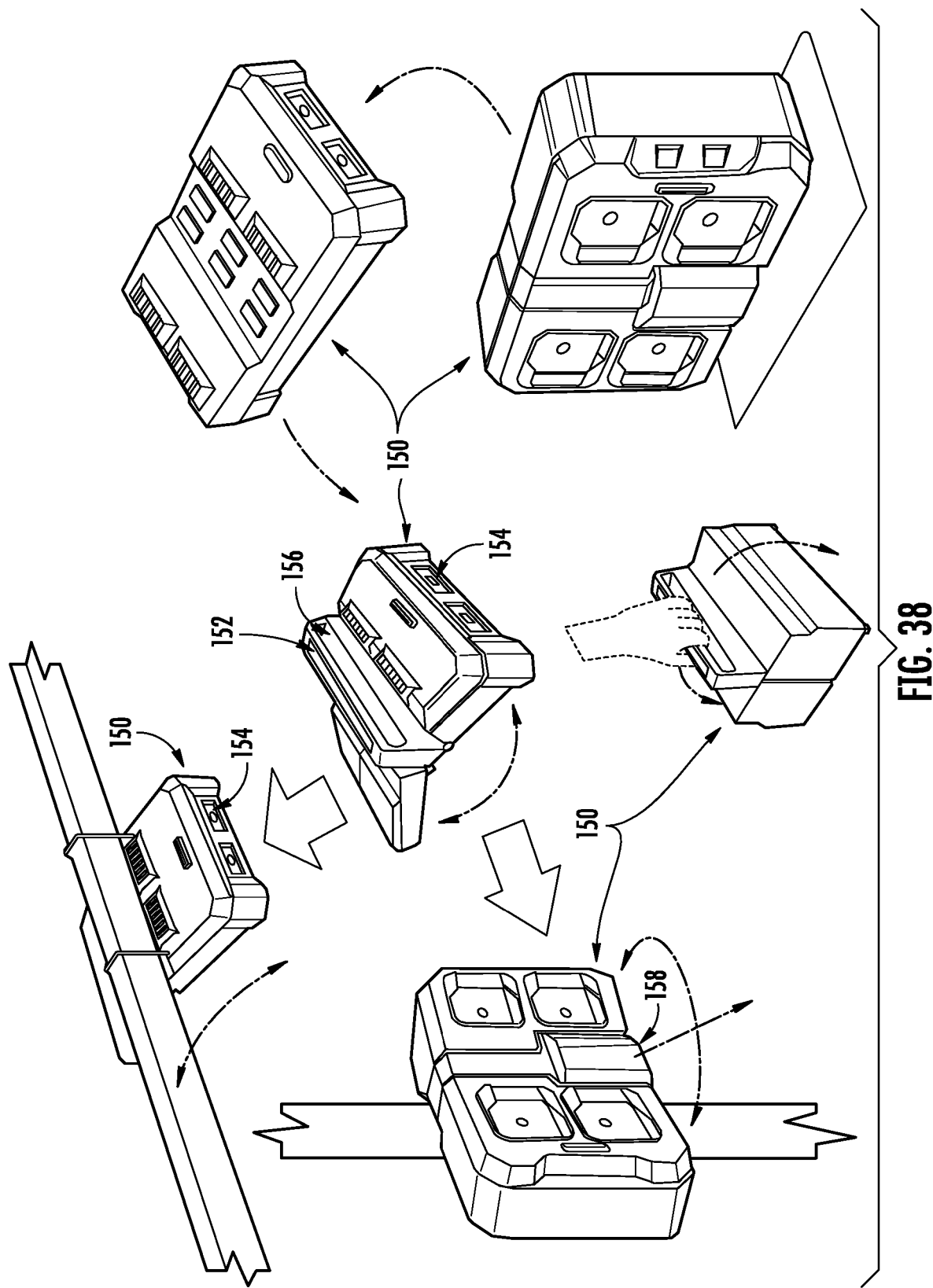
FIG. 38 is a perspective view of a light according to one embodiment for use with the modular storage system of FIG. 29.

FIG. 38 illustrates a light 150 according to another embodiment. In the embodiment illustrated in FIG. 38, the light 150 includes first and second light panels, which include LEDs 154, and that are movable (e.g., foldable) relative to one another. The light 150 also has a handle 156 to make it transportable. The light 150 is movably (e.g., pivotably) coupled to a container. The container includes a coupling mechanism (e.g., magnets 152) such that the container, with the light, can be coupled to an object (e.g., beam or post). Moreover, the light 150 is compact, emits light 360 degrees, illuminates the path of the user, and provides storage for small accessories and hand tools. Moreover, the light 150 may be constructed as a tower light or a task light. In a specific embodiment the light 150 is powered by battery 158.

Figure 39:
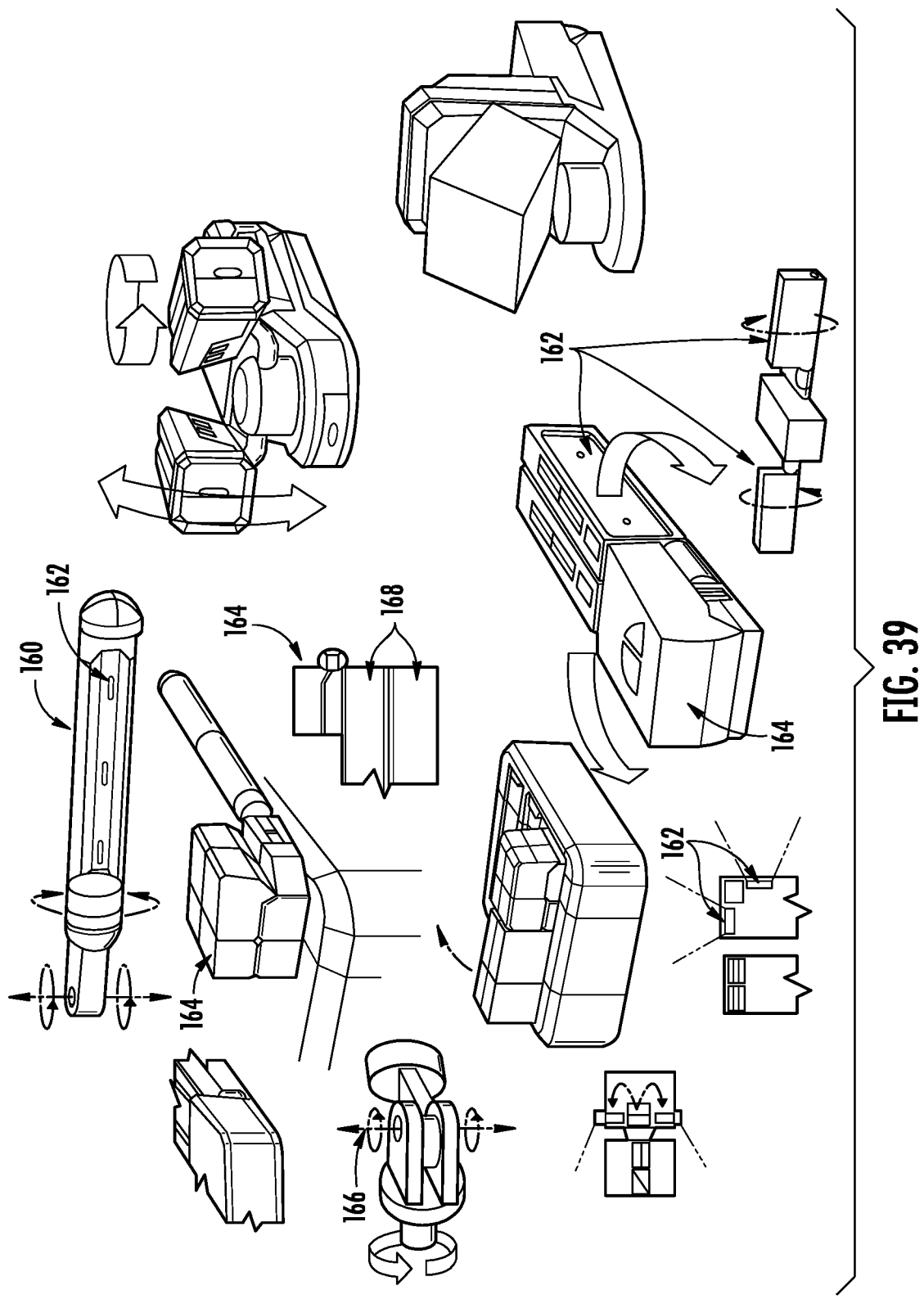
FIG. 39 is a perspective view of a light according to one embodiment for use with the modular storage system of FIG. 29.

FIG. 39 illustrates a hand-held light for use with the modular storage system. In one aspect, the light 160 is positioned or incorporated within an elongate body. The elongate body is movably coupled to a housing, which receives a power source (e.g., battery pack). In the illustrated embodiment, the elongate body is hingedly coupled to the housing. The housing may be removably coupled to a container of the modular storage system and therefore the light may be movable or pivotable to the container. The elongate body may be formed from or include frosted glass.

In another aspect of FIG. 39, the light 160 is movably coupled to a housing, which is removably coupled to a container of the modular storage system. The lights 160 may be coupled to a support, which extends from the housing. Moreover, the lights 160 may be movable (e.g., pivotable or rotatable) about the supports. In the illustrated embodiment, the lights 160 are pivotable about two axes. Additionally or alternatively, the light 160 may be movable or pivotable within the housing about axis 166. In a specific embodiment, light 160 and/or battery pack 164 may be stacked on one or more boxes 168.

In another aspect of FIG. 39, the lights 160 are movably (e.g., pivotably or rotatably) coupled to the power source or battery pack 164. In this aspect, each of the lights 160 moves (e.g., pivots) to an opposite side of the battery pack. Moreover, the lights 160 may be rotatable about their own axes. The lights 160 and battery pack 164 can be selectively placed in slots in the container. That is, the battery pack 164 can be placed in one slot, while the lights 160 may be placed in adjacent slots. The user can alter the configuration of the lights 160 by manipulating or placing the battery pack 164 and lights 160 in various slots in the container. The lights 160 may be coupled to the same surface of the battery pack 164 or opposite surfaces of the battery pack.

In each aspect of FIG. 39 the lights 160 are couplable and movable (e.g., pivotable, rotatable) relative to a container of the modular support system, but are also configured to be hand-held. Moreover, the light 160 may have LEDs 162 on a single surface or multiple surfaces. Also, the container may have a housing with lights positioned within the housing. Accordingly, the light may provide path illumination or task illumination.

Although the disclosure has been described in detail with reference to certain preferred embodiments, variations and modifications exist within the scope and spirit of one or more independent aspects of the disclosure as described.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A stackable lighting unit configured to couple to a stackable storage unit, the stackable lighting unit comprising:
    a housing;
    a bottom surface defined by the housing, the bottom surface comprising coupling components that couple the bottom surface of the stackable lighting unit to a top surface of the stackable storage unit;
    a first light pivotally coupled to the housing, the first light pivotally rotating about a first rotational axis with respect to the housing;
    a second light pivotally coupled to the housing and the second light pivots about a second rotational axis with respect to the housing, the second rotational axis is distinct from the first rotational axis; and
    a third light pivotally coupled to the housing and the third light pivots about a third rotational axis with respect to the housing, the third rotational axis is distinct from the first rotational axis and the second rotational axis.

2. The stackable lighting unit of claim 1, wherein the second rotational axis is perpendicular to at least one of the first rotational axis and the third rotational axis.

3. The stackable lighting unit of claim 1, further comprising:
    a plurality of lighting modes in which different combinations of the first light, the second light, and the third light are illuminated when different ones of the plurality of lighting modes are selected.

4. The stackable lighting unit of claim 1, further comprising:
    a top panel coupled to the housing opposite the bottom surface, wherein the first light pivots between an open position in which the first light extends above the top panel and a retracted position in which the first light is adjacent to a sidewall of the stackable lighting unit.

5. The stackable lighting unit of claim 3, further comprising:
    a tab that protrudes from the first light when the first light is in a retracted position, wherein the tab protrudes over a sidewall of the stackable lighting unit.

6. The stackable lighting unit of claim 1, wherein the first light is rotatable with respect to the housing about a fourth rotational axis that is perpendicular to the first rotational axis.

7. The stackable lighting unit of claim 1,
    wherein the first light comprises a focused light and the second light is selected from the group consisting of an area light and a flood light.

8. A container assembly comprising:
    a lighting unit comprising:
        a first housing;
        a bottom surface defined by the first housing, the bottom surface comprising a first coupling component;
        a first light pivotally coupled to the first housing, the first light pivotally rotating about a first rotational axis with respect to the first housing; and
    a storage unit comprising:
        a second housing;
        a storage space defined within the second housing;
        a top surface defined by the second housing, the top surface comprising a second coupling component, wherein the lighting unit and the storage unit are coupled together via first coupling component of the lighting unit interfacing with the second coupling component of the storage unit.

9. The container assembly of claim 8, further comprising a top surface defined by the first housing, the top surface comprising a third coupling component, the container assembly further comprising:
    a second storage unit comprising:
        a third housing;
        a storage space defined within the third housing;
        a bottom surface defined by the third housing, the bottom surface comprising a fourth coupling component, wherein the top surface of the lighting unit and the bottom surface of the storage unit are coupled together via the third coupling component of the lighting unit interfacing with the fourth coupling component of the second storage unit.

10. The container assembly of claim 8, the container assembly further comprising a handle that projects laterally from a sidewall of the first housing.

11. The container assembly of claim 8, wherein the first light is rotatable with respect to the first housing of the lighting unit about a second rotational axis that is perpendicular to the first rotational axis.

12. The container assembly of claim 8, further comprising:
- a second light pivotally coupled to the first housing of the lighting unit, the second light pivots about a third rotational axis with respect to the first housing of the lighting unit, wherein the third rotational axis is distinct from the first rotational axis; and
- a third light pivotally coupled to the first housing of the lighting unit, the third light pivots about a fourth rotational axis with respect to the first housing of the lighting unit, wherein the fourth rotational axis is distinct from the first rotational axis and the third rotational axis.

13. The container assembly of claim 12, wherein the first rotational axis of the first light and the fourth rotational axis of the third light are parallel.

14. A stackable lighting unit configured to couple to a stackable storage unit, the stackable lighting unit comprising:
- a housing;
- a bottom surface defined by the housing, the bottom surface comprising coupling components that couple the bottom surface of the stackable lighting unit to a top surface of a stackable storage unit;
- a first light coupled to the housing; and
- a battery interface configured to interface to a rechargeable battery for personal power tools.

15. The stackable lighting unit of claim 14, wherein the first light pivots about a first rotational axis with respect to the housing.

16. The stackable lighting unit of claim 14, further comprising a USB-compliant electrical outlet.

17. The stackable lighting unit of claim 16, further comprising a storage compartment defined within the housing, wherein the storage compartment is dimensioned to receive a cellular telephone.

18. The stackable lighting unit of claim 17, further comprising a door pivotally coupled to the housing, the door actuating between a first position in which the door encloses the USB-compliant electrical outlet and the storage compartment, and a second position in which the USB-compliant electrical outlet and the storage compartment are not enclosed by the door.

19. The stackable lighting unit of claim 15, further comprising:
- a side surface defined by the housing, wherein the side surface defines a recess; and
- a plurality of projections extending from the recess, the plurality of projections configured to interface with a power cable being stored within the recess.

* * * * *